(12) United States Patent
Wright

(10) Patent No.: US 12,399,680 B2
(45) Date of Patent: Aug. 26, 2025

(54) SYSTEM AND METHOD FOR REAL-TIME AUDIO DESCRIPTION IN A VEHICLE

(71) Applicant: GM GLOBAL TECHNOLOGY OPERATIONS LLC, Detroit, MI (US)

(72) Inventor: Adam L. Wright, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 387 days.

(21) Appl. No.: 18/168,018

(22) Filed: Feb. 13, 2023

(65) Prior Publication Data
US 2024/0272869 A1    Aug. 15, 2024

(51) Int. Cl.
*G06F 3/16*       (2006.01)
*G06V 20/00*   (2022.01)
*G06V 20/70*   (2022.01)

(52) U.S. Cl.
CPC .............. *G06F 3/167* (2013.01); *G06V 20/38* (2022.01); *G06V 20/70* (2022.01)

(58) Field of Classification Search
CPC ......... G06F 3/167; G06F 3/165; G06V 20/38; G06V 20/70; G06V 10/95; G06V 20/56; B60W 50/00; B60W 2050/0005; H04L 67/12; G10L 13/02; G10L 13/027
See application file for complete search history.

(56) References Cited

U.S. PATENT DOCUMENTS

| | | | |
|---|---|---|---|
| 9,451,335 B2* | 9/2016 | Gopalan | H04N 21/44016 |
| 11,277,708 B1* | 3/2022 | Grani | B60Q 5/005 |
| 2013/0107121 A1* | 5/2013 | Blanchard | G09B 21/006 |
| | | | 348/553 |
| 2020/0209000 A1* | 7/2020 | Oltramari | G01C 21/3697 |

* cited by examiner

*Primary Examiner* — Vivian C Chin
*Assistant Examiner* — Annabelle Kang
(74) *Attorney, Agent, or Firm* — Quinn IP Law

(57) ABSTRACT

A system of providing audio description in a vehicle includes one or more vehicle sensors configured to provide perception data. An audio unit is adapted to transmit an audio signal inside the vehicle. The system includes a controller having a processor and tangible, non-transitory memory on which instructions are recorded. The controller is adapted to identify elements in a scene in proximity to the vehicle based in part on input data from a plurality of source, including the perception data from the vehicle sensors. The controller is adapted to generate output data based in part on the elements identified in the scene. The output data is merged into one or more cohesive sentences for the audio description. The controller is adapted to determine an output sequence for the audio description based on a predefined list of priorities and transmit the audio description through the audio unit in the output sequence.

20 Claims, 4 Drawing Sheets

SYSTEM AND METHOD FOR REAL-TIME AUDIO DESCRIPTION IN A VEHICLE

INTRODUCTION

The present disclosure relates generally to a system and method for providing audio description in a vehicle in real-time. It is an undeniable facet of modern life that many people spend a considerable amount of time in their vehicles, while being transported from one place to another. Be it a long road trip or a short drive, there are countless things that may be observed by occupants of the vehicle, e.g., through a window or windshield. However, for low vision or visually impaired passengers there are many visual elements of a drive or long road trip that are missed out on.

SUMMARY

Disclosed herein is a system of providing audio description in a vehicle. The system includes one or more vehicle sensors configured to provide perception data. An audio unit is adapted to transmit an audio signal inside the vehicle. The system includes a controller having a processor and tangible, non-transitory memory on which instructions are recorded. The controller is adapted to identify elements in a scene in proximity to the vehicle based in part on input data from a plurality of sources, including the perception data from the vehicle sensors. The controller is adapted to generate output data based in part on the elements identified in the scene. The output data is merged into one or more cohesive sentences for the audio description. The controller is adapted to determine an output sequence for the audio description based on a predefined list of priorities and transmit the audio description through the audio unit in the output sequence.

In some embodiments, the controller is adapted to transmit the audio description to a smart device located within the vehicle. The audio description may include traffic updates. The plurality of sources may include map information pertaining to at least one of traffic conditions, construction areas and zonal classification. In some embodiments, the audio description includes real-time lighting conditions and weather updates. The vehicle sensors may include at least one of a radar unit, a lidar unit and a camera. The elements identified in the scene may include billboards and/or advertising signs. The plurality of sources may include crowd-sourced data. The vehicle sensors may include at least one of a radar unit, a lidar unit and a camera.

In some embodiments, the audio description may include a continuous play setting allowing the audio signal to be continuously transmitted, and a prompted setting such that the audio description commences upon a prompt. The prompt includes a landmark and/or a specific event. The controller may be adapted to remove redundant portions of the audio descriptions. In some embodiments, the controller is adapted to monitor for high-priority interruptions and adjust the output sequence based on the high-priority interruptions.

Disclosed herein is a method of providing audio description in a vehicle having one or more vehicle sensors, an audio unit and a controller having a processor and tangible, non-transitory memory on which instructions are recorded. The method includes identifying elements in a scene in proximity to the vehicle based in part on input data from a plurality of sources, including the one or more vehicle sensors. Output data is generated based in part on the elements identified in the scene. The method includes merging the output data into one or more cohesive sentences for the audio description. The method includes determining an output sequence for the audio description based on a predefined list of priorities and transmitting the audio description through the audio unit in the output sequence.

The above features and advantages and other features and advantages of the present disclosure are readily apparent from the following detailed description of the best modes for carrying out the disclosure when taken in connection with the accompanying drawings.

Figure 1:
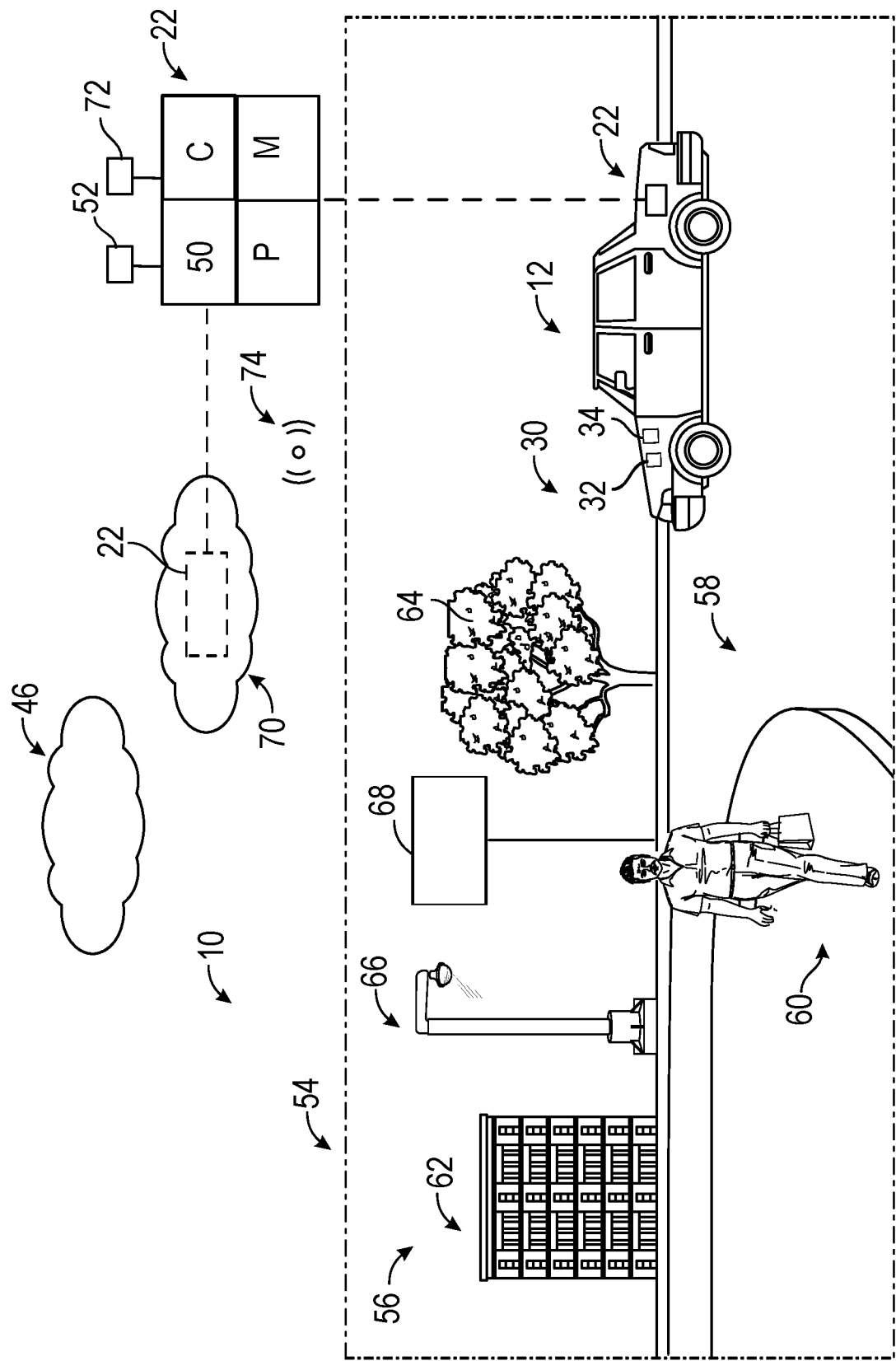
FIG. 1 is a schematic fragmentary diagram of a system for providing real-time audio descriptions in a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 2:
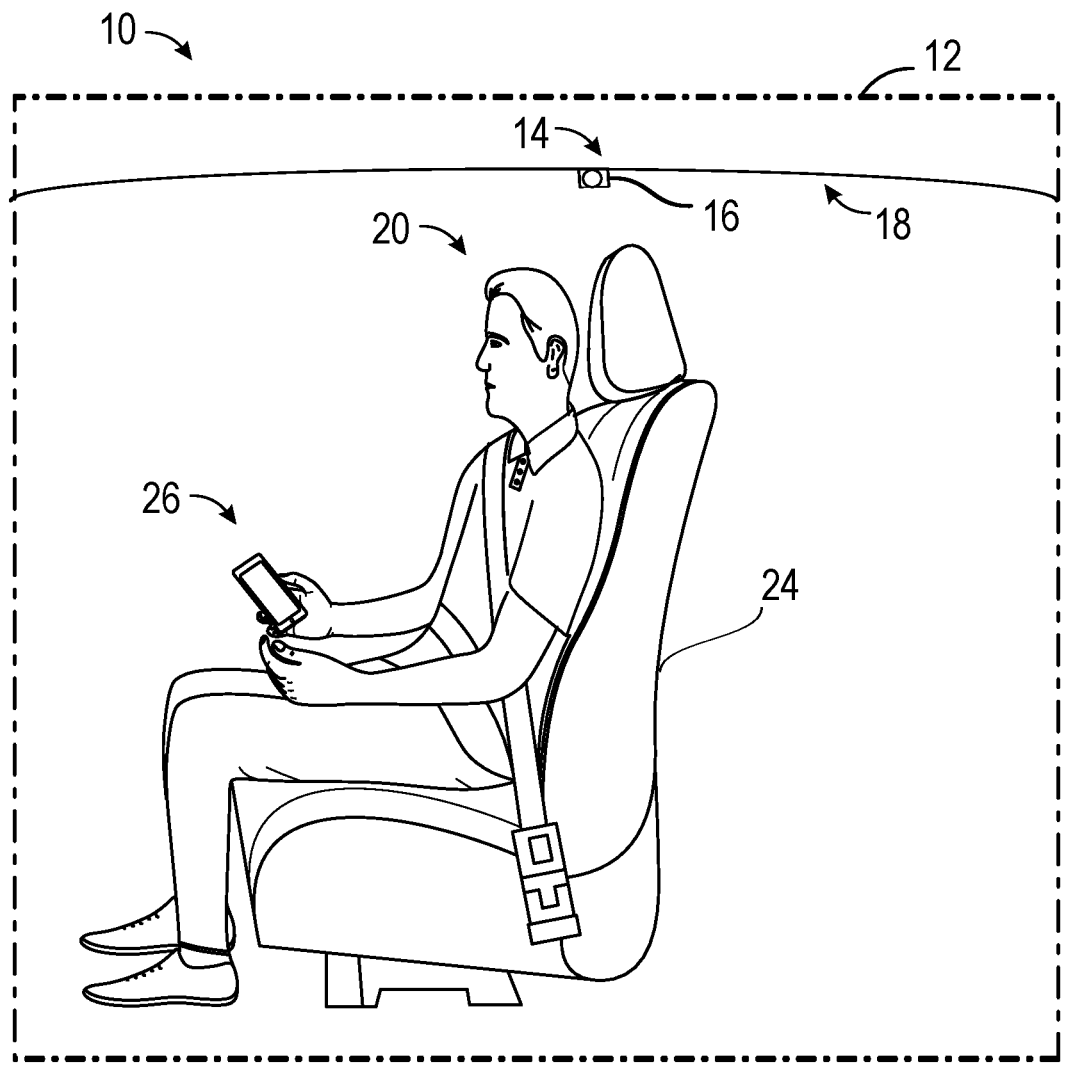
FIG. 2 is a schematic fragmentary diagram of an occupant in the vehicle of FIG. 1.
Figure 2:
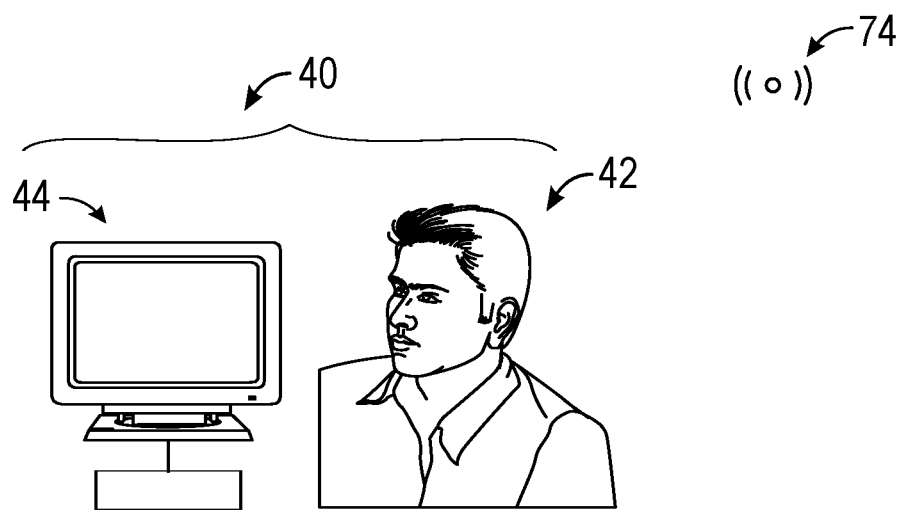

Referring to the drawings, wherein like reference numbers refer to like components, FIGS. 1-2 schematically illustrate a system 10 of controlling operation of a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an electric vehicle, which may be purely electric or hybrid/partially electric. It is to be understood that the vehicle 12 may take many different forms and have additional components. It is understood that the FIGS. are not drawn to scale.

Referring to FIG. 2, the vehicle 12 includes an audio unit 14 with at least one speaker 16 capable of transmitting an audio signal. The audio unit 14 may include a microphone (not shown) and other accessories. The speaker 16 may be an analog speaker, a digital speaker, a combination of the two or other type of speaker available to those skilled in the art. The types of audio signals broadcasted by the speaker 16 may include, but are not limited to, voice narration, chimes, beeping, ringtones, musical notes, alarms and other types of sounds. The location of the speaker 16 in the vehicle 12 may be varied. Referring to FIG. 2, the speaker 16 may be attached to the ceiling 18 of the vehicle 12, within hearing distance of an occupant 20.

Referring to FIG. 1, the system 10 includes a command unit 22 having a controller C, at least one processor P and at least one memory M (or non-transitory, tangible computer readable storage medium) on which instructions are recorded for a method 100 (described below with respect to FIGS. 3-4) of operating an audio description mode 50. The memory M can store command unit-executable instruction sets, and the processor P can execute the command unit-executable instruction sets stored in the memory M.

Referring to FIG. 2, the occupant 20 on the vehicle seat 24 may be at least partially visually impaired or unable to sufficiently visualize their environment. There are many visual elements of a drive or long road trip that visually impaired passengers miss out on. It is challenging to create an audio description of a dynamic scene as many objects are constantly changing. The system 10 (via execution of the audio description mode 50) allows the visual content of the environment surrounding the vehicle 12 to be narrated to the occupant 20.

As described below, the system 10 provides in-vehicle audio descriptions (that may be voice narrated) that describe various things such as popular landmarks, scenic overlooks, environmental setting, unique objects, etc. An example audio description may be, "driving by the General Motors headquarters, which looks like . . . .". The audio description may include traffic updates in real-time. This may be further enhanced with real time updates such as weather condition, sunset condition, lighting, tree colors or other seasonal elements such as snow cover, etc. Another example audio description may be, "light rainy day with overcast sky. Heavier than normal slow-moving traffic."

The audio description may be broadcasted through multiple sources, including the audio unit 14 in the vehicle 12 and one or more connected devices belonging to occupants of the vehicle 12. Referring to FIG. 2, there may exist an option to push the audio description to a smart device 26 belonging to a specific passenger, through Bluetooth™, WIFI and BLE, for example. In one embodiment, the vehicle 12 is an autonomous vehicle utilizing the audio description mode 50 for audio tours in popular tourist destinations such as historic sites.

Referring to FIG. 1, the command unit 22 receives input from one or more vehicle sensors 30. The vehicle sensors 30 may include a camera 32, which may be motion sensitive, and headlamp sensor 34. The vehicle sensors 30 may include a lidar unit, a radar unit and other devices available to those skilled in the art.

Figure 3:
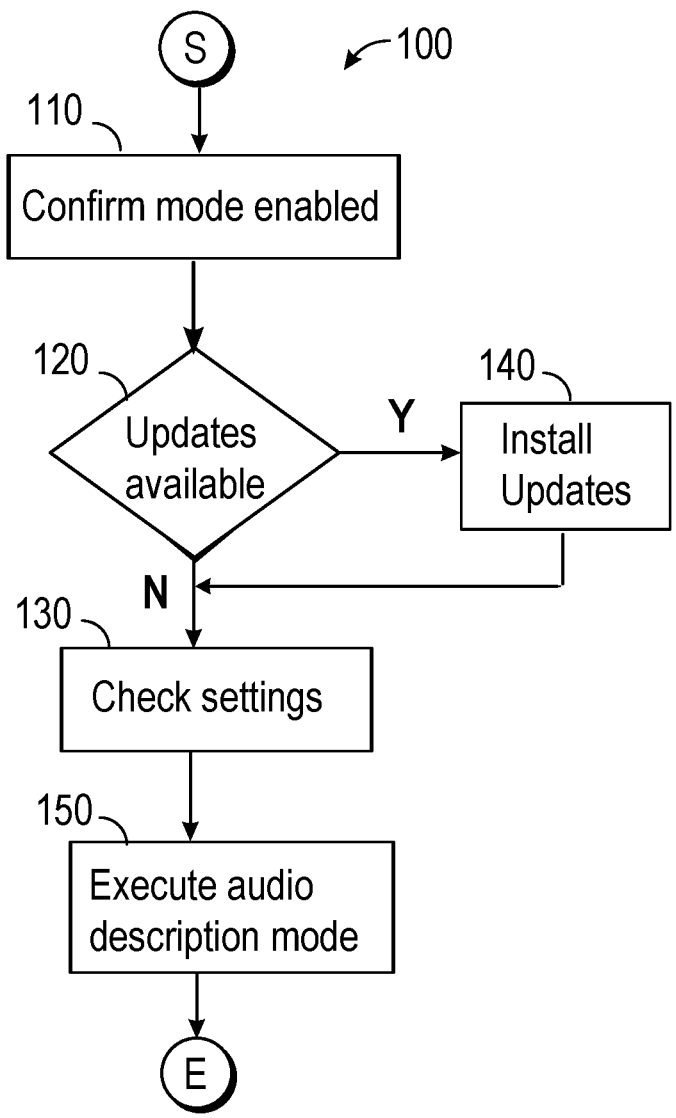
FIG. 3 is a flowchart for a method of providing audio description in a vehicle.

Referring to FIG. 3, a flowchart of method 100 is shown. Method 100 need not be applied in the specific order recited herein. Furthermore, it is to be understood that some blocks may be eliminated. In some embodiments, method 100 may be embodied as computer-readable code or stored instructions and may be at least partially executable by the controller C.

Beginning at block 110 of FIG. 3, the controller C is adapted to confirm whether the audio description mode 50 has been enabled. Once confirmed, the method 100 advances to block 120 to determine if updates to the audio description mode 50 are needed and/or available. If updates are not needed (block 120=NO), method 100 advances to block 130 to select settings for the audio description mode 50.

The audio description mode 50 may include adjustable settings based on user input (e.g., push button and/or verbal). The audio description mode 50 may include a prompted setting such that the narration or audio description commences upon a prompt, the prompt including a landmark and/or a specific event. Additionally, the audio description mode 50 may include a continuous play setting allowing the audio signal to be continuously transmitted until the audio description mode 50 is shut off.

The audio description mode 50 may be controllable by a remote advisory unit 40 (such as OnStar™), shown in FIG. 2. The remote advisory unit 40 may be manned electronically and/or by a remote advisor 42 having access to an electronic device 44 such as a desktop computer, laptop, tablet, cell phone or wearable device. The remote advisor 42 may have the ability to adjust the setting and change the prompts.

Proceeding to block 150 from block 130, the controller C is adapted to execute the audio description mode 50. If updates are needed and/or available (block 120=YES), method 100 advances to block 140 to install the update and then proceeds to block 130 and block 150 where the audio description mode 50 is executed.

Figure 4:
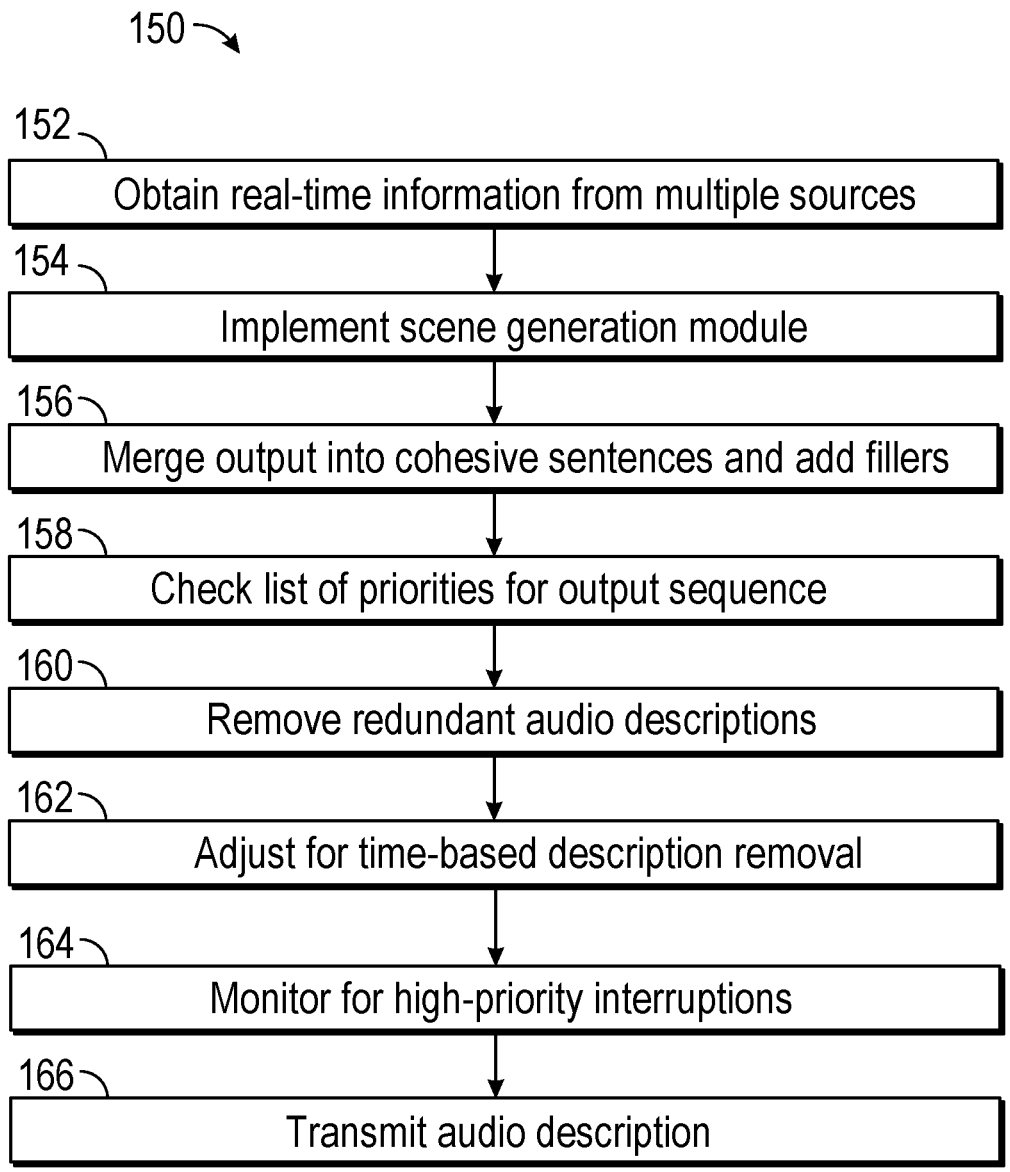
FIG. 4 illustrates a portion of the method of FIG. 3.

Block 150 is shown in detail in FIG. 4 and includes sub-blocks 152, 154, 156, 158, 160, 162, 164 and 166. It is understood that the sub-blocks in block 150 not be applied in the specific order recited herein and that some sub-blocks may be eliminated.

Beginning at sub-block 152 of FIG. 4, the controller C is adapted to obtain real time information, referred to herein as raw input data, to generate individual audio descriptions. The raw input data is obtained from a plurality of sources that are independent of one another. First, the raw input data may be obtained from the vehicle sensors 30.

Second, the plurality of sources may include map information or crowdsourced data downloaded from a remote server or database 46 (see FIG. 1). The map information may pertain to traffic conditions, construction areas and/or zonal classification (e.g., urban, suburban, rural). The crowdsourced data may be generated by users taking a picture of a scene, identifying unique characters in the scene and uploading audio descriptions at location pinpoints. In other words, anyone may upload audio descriptions for landmarks, scenic overlooks, popular destinations, buildings, unique road elements, etc. and tag it to a specific location. This data may be sent to the remote advisory unit 40 or other entity to create comprehensive audio description "maps" for vehicle users to download or be automatically downloaded on navigation. If no audio description exists for these unique elements, an image may be sent to a dedicated actor to upload in real-time, e.g., through a smartphone application.

Advancing to sub-block 154, a scene generation module 52 is executed by the controller C. Referring to FIG. 1, the vehicle 12 may be in proximity to a scene 54. The audio description of the scene 54 includes various elements 56 identified by the scene generation module 52 using the raw input data obtained in sub-block 152. The various elements 56 in the scene 54 may include the adjacent street 58, a pedestrian 60 walking on a sidewalk and structures such as a building or landmark 62. The elements 56 identified in the scene 54 may include forestry, such as a tree 64, and electrical structures, such as a light pole 66. The elements 56 identified in the scene 54 may include billboards and/or advertising signs 68. The elements 56 identified in the scene 54 may include other vehicles.

Each of these elements 56 may be identified by an object recognition algorithm available to those skilled in the art. Many object recognition algorithm employ neural networks and machine learned models to identify objects in a scene. The controller C may create a stored audio description for each unique perception classification, with the audio description being stored in a database 46 for use by the scene generation module 52. The elements 56 may be matched with an automated audio description that is generated utilizing a look up table or similar database. The controller C may send the audio descriptions to the vehicle 12 or an audio back office or V2X.

Proceeding to sub-block 156, the output data from the scene generation module 52 is merged into one or more cohesive sentences for the audio description. A diction program or application may be employed to create grammatically correct sentences. Additionally, the controller C is adapted to add filler words to the descriptions. For example, the fillers may include descriptions of where the scene element is relative to the vehicle 12, such as "Restaurant X is coming up to your left."

The audio description of the scene may include real time weather and lighting (sun/moon) conditions. These audio descriptions may be generated from the vehicle sensors 30 (e.g., camera or headlamp sensors to determine the amount of visible light), local weather broadcast downloaded from a remote server or database 46, or a combination.

Advancing to sub-block 158, the controller C is adapted to check a calibrated list of priorities and create an output sequence based on the list of priorities. For example, the description of the scene outside the vehicle 12 may be placed earlier in the output sequence than lighting conditions.

Advancing to sub-block 160, the audio description mode 50 includes removing or editing redundant portions of the audio description. For example, if there are many cars in the scene, the audio description will not repeat "car, car, car, car, car". The elements may be grouped and edited in the audio description as "many cars in scene". The controller C may be adapted to access a database/memory of audio description elements and a form of prioritization to reduce the number of repetitive or redundant descriptions.

Proceeding to sub-block 162, the audio description mode 50 includes adjusting for time-based description edits (addition or removal). For example, the weather updates, traffic updates and lighting conditions may be selected to be retrieved and broadcasted at fixed periods, such as once every one hour. Thus even if the output sequence specifies that it is now the turn for traffic updates in the sequence, the traffic update may be removed or postponed until the fixed period (e.g., one hour) has elapsed.

Advancing to sub-block 164, the controller C is adapted to monitor for high-priority interruptions. In other words, the broadcast of the audio description may be interrupted for matters that are classified as having relatively higher priority. For example, the audio description of weather updates may be interrupted to inform tell the occupant 20 why the vehicle 12 is braking or steering aggressively.

Proceeding to sub-block 166, the audio description is broadcast within the vehicle through the speaker 16. The controller C may be adapted to transmit the audio description to a smart device 26 located within the vehicle 12. With many passengers in the vehicle 12, there may exist an option to push the audio description to a smart device 26 belonging to a specific passenger. This may be accomplished through Bluetooth™, WIFI and Bluetooth Low Energy (BLE), for example. The occupant 20 may select their smart device 26 for audio description while allowing the vehicle speaker 16 to be used for other purposes such as radio, navigation, phone call etc.

A noted above, the elements 56 identified in the scene 54 may include billboards and/or advertising signs 68, e.g., restaurant signs, etc. In some embodiment, these advertisements may be monetized. For example, the audio description mode 50 may be extended to allow paid advertisements to play at particular locations. Additionally, hearing the audio description may result in an impromptu urge like deciding to stop for a cup of coffee; the concurrence of these events may be monetized.

In one embodiment, the controller C is embedded in the vehicle 12. If the vehicle 12 is part of a fleet, the controller C may be embedded in a master or leader vehicle. In another embodiment, the controller C may be hosted or based out of a remotely located cloud computing service 70. The cloud computing service 70 may include one or more remote servers hosted on the Internet to store, manage, and process data. The cloud computing service 70 may be at least partially managed by personnel at various locations.

Referring to FIG. 1, the vehicle 12 may include a telematics module 72 for establishing two-way communications between the controller C and the cloud computing service 70. The telematics module 72 may collect transmission data from the audio unit 14 and telemetry data, such as location, speed, engine data, maintenance requirements and servicing, by interfacing with various internal sub-systems. The telematics module 72 may enable vehicle-to-vehicle (V2V) communication and/or a vehicle-to-everything (V2X) communication.

The system 10 may employ a wireless network 74 (see FIGS. 1-2) for communications between the vehicle 12 and other entities, such as the cloud computing service 70 (FIG. 1) and the remote advisory unit 40. The wireless network 74 may be a short-range network or a long-range network. The wireless network 74 may be a communication BUS, which may be in the form of a serial Controller Area Network (CAN-BUS).

The wireless network 74 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 74 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

In summary, an effective way of providing audio description in a vehicle 12 is disclosed. The method 100 provides an opportunity to significantly improve driving experience for visually impaired passengers. The method 100 includes gathering current scene information by compiling independent information from a plurality of sources. The controller C is adapted to output a scene description as well as real-time weather, lighting conditions and traffic updates. In one embodiment, the system 10 may identify popular visual scenarios along the route, and this may prompt an audio description narrative.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings.

Accordingly, such other embodiments fall within the framework of the scope of the appended claims.

What is claimed is:

1. A system of providing audio description in a vehicle, the system comprising:
   one or more vehicle sensors configured to provide perception data;
   an audio unit adapted to transmit an audio signal inside the vehicle;
   a controller having a processor and tangible, non-transitory memory on which instructions are recorded, the controller being adapted to:
      identify elements in a scene in proximity to the vehicle based in part on input data from a plurality of sources, including the perception data from the one or more vehicle sensors;
      generate output data based in part on the elements identified in the scene;
      merge the output data into one or more cohesive sentences for the audio description;
      determine an output sequence for the audio description based on a predefined list of priorities and transmit the audio description through the audio unit in the output sequence; and
      monitor for high-priority interruptions and adjust the output sequence based on the high-priority interruptions.

2. The system of claim 1, wherein the controller is adapted to transmit the audio description to a smart device located within the vehicle.

3. The system of claim 1, wherein the audio description includes traffic updates, and the plurality of sources includes map information pertaining to at least one of traffic conditions, construction areas and zonal classification.

4. The system of claim 1, wherein the audio description includes real-time lighting conditions and weather updates and the one or more vehicle sensors includes at least one of a radar unit, a lidar unit and a camera.

5. The system of claim 1, wherein the elements identified in the scene includes billboards and/or advertising signs.

6. The system of claim 1, wherein the plurality of sources includes crowdsourced data.

7. The system of claim 1, wherein the one or more vehicle sensors includes at least one of a radar unit, a lidar unit and a camera.

8. The system of claim 1, wherein the audio description includes:
   a continuous play setting allowing the audio signal to be continuously transmitted; and
   a prompted setting such that the audio description commences upon a prompt, the prompt including a landmark and/or a specific event.

9. The system of claim 1, wherein the controller is adapted to remove redundant portions of the audio descriptions.

10. A method of providing audio description in a vehicle having one or more vehicle sensors, an audio unit and a controller having a processor and tangible, non-transitory memory on which instructions are recorded, the method comprising:
   identifying elements in a scene in proximity to the vehicle based in part on input data from a plurality of sources, including the one or more vehicle sensors;

generating output data based in part on the elements identified in the scene;
merging the output data into one or more cohesive sentences for the audio description;
determining an output sequence for the audio description based on a predefined list of priorities; and
transmitting the audio description through the audio unit in the output sequence;
incorporating a continuous play setting allowing the audio description to be continuously transmitted; and
incorporating a prompted setting allowing the audio description to commence upon a prompt, the prompt including a landmark and/or a specific event.

11. The method of claim 10, further comprising:
transmitting the audio description to a smart device located within the vehicle, via the controller.

12. The method of claim 10, further comprising:
incorporating traffic updates in the audio description, the plurality of sources including map information pertaining to at least one of traffic conditions, construction areas and zonal classification.

13. The method of claim 10, further comprising:
incorporating real-time lighting conditions and weather updates in the audio description.

14. The method of claim 10, further comprising:
including billboards and/or advertising signs in the elements identified in the scene.

15. The method of claim 10, further comprising:
removing redundant portions of the audio description; and
incorporating crowdsourced data in the plurality of sources.

16. The method of claim 10, further comprising:
monitoring for high-priority interruptions and adjusting the output sequence based on the high-priority interruptions, via the controller.

17. A system of providing audio description in a vehicle, the system comprising:
one or more vehicle sensors configured to provide perception data;
an audio unit adapted to transmit an audio signal inside the vehicle;
a controller having a processor and tangible, non-transitory memory on which instructions are recorded;
wherein the audio description includes:
a continuous play setting allowing the audio signal to be continuously transmitted; and
a prompted setting such that the audio description commences upon a prompt, the prompt including a landmark and/or a specific event; and
wherein the controller is adapted to:
identify elements in a scene in proximity to the vehicle based in part on input data from a plurality of sources, including the perception data from the one or more vehicle sensors;
generate output data based in part on the elements identified in the scene;
merge the output data into one or more cohesive sentences for the audio description; and
determine an output sequence for the audio description based on a predefined list of priorities and transmit the audio description through the audio unit in the output sequence.

18. The system of claim 17, wherein the controller is adapted to transmit the audio description to a smart device located within the vehicle.

19. The system of claim 17, wherein the audio description includes traffic updates, and the plurality of sources includes map information pertaining to at least one of traffic conditions, construction areas and zonal classification.

20. The system of claim 17, wherein the audio description includes real-time lighting conditions and weather updates, the one or more vehicle sensors including at least one of a radar unit, a lidar unit and a camera.

* * * * *